United States Patent Office 3,109,025
Patented Oct. 29, 1963

3,109,025
DECOLORIZING MALEIC ACID SOLUTION
Harry Olenberg, Bronx, N.Y., assignor to Halcon International, Inc., a corporation of Delaware
No Drawing. Filed June 17, 1960, Ser. No. 36,743
5 Claims. (Cl. 260—537)

This invention relates to a process for decolorizing colored aqueous maleic acid liquors to provide relatively pure maleic acid solutions, and more particularly to such a process wherein the liquor is contacted with both activated carbon and a cation exchange resin in critical relationship.

Maleic acid is a commercially interesting material which may be obtained from scrubber liquors made in a conventional plant for oxidizing benzene with air. The liquors may be dark-colored, and for many purposes it is desired to have substantially colorless liquors, such as for the conversion of the acid to high quality fumaric acid. The art is confronted by the problem of providing a method for obtaining low colored maleic acid in an economic manner from commercial maleic acid solutions, especially the dark-colored scrubber liquors.

The standard used to indicate the quantity or intensity of color of the products in solution form is known as the APHA standard color test. This test is one developed by the American Public Health Association and is known as the Hazen Platinum Cobalt Scale, a description of which is found on page 2048 of the 5th edition of "Standard Methods of Chemical Analysis" by Wilford W. Scott. For the colored feedstock which may be too dark to fit in the above mentioned scale, the standard used to indicate the quantity or intensity of color contained in the liquids is that known as the Gardner Color Standard (1933). This is the official color system of the Paint and Varnish Industry and a description thereof is found on page 69 of "Physical and Chemical Examination of Paints, Varnishes, Lacquers and Colors," 9th ed. 1939, Institute of Paint and Varnish Research, Washington, D.C. by Henry A. Gardner.

The discoveries associated with the invention and relating to the solution of the above problems, and the objects achieved in accordance with the invention as set forth herein include the following provision of:

a process for decolorizing dark crude aqueous maleic acid solution which comprises passing it through a first zone containing activated carbon, a second zone containing cation exchange resin (acid form) and preferably then a third zone containing activated carbon each at a temperature in the range of 10 to 110° C.

such processes wherein the effluent is passed through a zone containing activated carbon and the amount of solution per 0.5 part by weight activated carbon in each zone and per 0.12 part of the resin is in the range of 10 to 450 parts;

such processes wherein the flow rate is in the range of 0.011 to 5.5 parts per second;

such processes wherein the feed is 350 parts by weight of solution containing 38% maleic acid, and each activated carbon zone contains 15 parts and the resin zone contains 20 parts of poly-styrene sulfonic acid cation exchange resin, the flow rate being 0.11 part per second;

such processes wherein the feedstock is of a 1933 Gardner liquid color of about 15 and the effluent is of an A.P.H.A. color of about 60;

such processes wherein the carbon and the resin are intimately mixed; such processes wherein the feedstock is of a Gardner color of about 8 and the effluent is of an A.P.H.A. color of about 35;

and other objects which will be apparent as details or embodiments of the invention are set forth hereinafter.

In order to indicate still more fully the nature of the present invention, the following examples of typical procedures are set forth in which parts and percent mean part and percent by weight, respectively, unless otherwise indicated, it being understood that these examples are presented as illustrative only and are not intended to limit the scope of the invention.

EXAMPLE I

The apparatus used is a series of three packed columns, two containing activated carbon and one cation exchange resin arranged as indicated. All columns are 24" long with an I.D.-5/16". Each run is at room temperature using fresh absorbents. A 38% aqueous maleic acid solution having a Gardner color of 8 is passed through the system at a rate of 0.11 gms. per second, and 350 gms. of solution is used per run.

1st column=15 gms. activated carbon
2nd column=20 gms. cation exchange resin (acid form of polymeric styrene sulfonic acid)
3rd column=15 gms. activated carbon
APHA color 3rd column effluent=35

Comparative Example A

The procedure of Example 1 is repeated except using the following system.

1st column=15 gms. activated carbon
2nd column=omitted
3rd column=15 gms. activated carbon
APHA color 3rd column effluent=70

It is evident from these results that the inclusion of the resin in accordance with Example 1 gives an about two-fold improvement, as compared to this example.

Comparative Example B

The procedure of Example 1 is repeated except using the following system.

1st column=20 gms. cation exchange resin
2nd column=20 gms. activated carbon
3rd column=15 gms. activated carbon
APHA color 3rd column effluent=65

It is evident from these results that the procedure of Example 1 gives an about two-fold improvement over this comparative example wherein the resin precedes the carbon.

EXAMPLE 2

The procedure of Example 1 is repeated except that the carbon and the resin are arranged in one column in staggered layers, and similar results are obtained.

EXAMPLE 3

The procedure of Example 2 is repeated except that the carbon and the resin are intimately mixed, and comparable results are obtained. This may be regarded as a sequence of first carbon and then resin. The important feature is to have some resin follow carbon.

EXAMPLE 4

The procedure of Example I is repeated except that the feedstock is a liquor having a Gardner liquid color of 15, and the APHA color of the 3rd column effluent is 60.

Comparable results to the foregoing may be obtained with various modifications thereof, including the following. The flow rate may be in the range of 0.011 to 5.5 parts per sec., desirably .01 to 2, and preferably 0.11 part. The amount of solution is 10 to 450 parts per 0.5 part of carbon and per 0.12 part of resin. The temperature may be in the range of 10 to 110° C., desirably 20 to 50, and preferably about 25° C. The proportion of resin to carbon may be in the range of .01 to 5 parts per part of carbon, desirably .05 to 2, and preferably .1 to 1.

The color of the feedstock may be in the range of 1 to 18 on the Gardner scale, desirably 1 to 8 and preferably 1 to 4.

Various well known cation exchange resins can be used in the practice of this invention. Representative examples of such cation exchange resins are organic compounds containing sulfonic, phosphonic, carboxylic or phenolic groups. Also, inorganic compounds such as the sodium aluminum silicates can be used.

Sulfonic acid type cation exchange resins, which constitute a preferred class, can be prepared by various methods. For example, they may be prepared by copolymerizing a major portion of styrene and a minor portion of divinyl benzene and then sulfonating the polymerization products by reaction with sulfuric acid. A commercially available material is Dow EX 50W-8X marketed by the Dow Chemical Co.

Phenolic resin type cation exchange resins can be prepared according to known practices. For example, a polyhydric phenol may be reacted with formaldehyde to give a phenolic resin.

Carboxylic acid type cation exchange resins can be made according to recognized procedures. For example, they may be made by reacting together resorcylic acid, formaldehyde and sodium hydroxide.

Resins which contain more than one of the indicated radicals are useful. For example, a resin containing sulfonic radicals and phenolic radicals can be prepared by condensing formaldehyde and phenol sulfonic acid together. Mixtures can be used if desired.

Representative decolorizing agents are activated charcoal and activated bone char; activated charcoal is a preferred material and this can be prepared by heating ordinary charcoal in the absence of oxygen. A commercially available material is OL grade carbon marketed by the Pittsburgh Coke & Chemical Co.

It is indeed surprising that the process of the invention gives white maleic acid in good yields even from originally brownish colored commercially produced maleic acid scrubber solutions, especially when one considers the large number of materials which have been tested and found unsuitable for this purpose.

In view of the foregoing disclosures, variations and modifications thereof will be apparent to one skilled in the art, and it is intended to include within the inventions all such variations and modifications except as do not come within the scope of the appended claims.

What is claimed is:

1. A process for decolorizing a dark crude aqueous maleic acid solution obtained from the air oxidation of benzene and having a Gardner liquid color of from 1 to 18, which comprises: contacting said solution with an adsorbent containing activated carbon and an acid form cation exchange resin, each at temperatures in the range of 10 to 110° C., under such conditions that said solution contacts at least some of said resin after contact with carbon; said adsorbent having .01 to 5 parts of resin to each part of carbon.

2. A process of claim 1 wherein the flow rate of said solution is in the range of 0.011 to 5.5 parts per sec. per part of adsorbent.

3. The process of claim 1 wherein said solution initially contacts a zone of activated carbon and subsequently contacts a zone of resin, said zones being separate and distinct.

4. The process of claim 1 wherein said activated carbon and resin are intimately admixed.

5. The process of claim 1 wherein said resin is a polystyrene sulphonic acid type.

References Cited in the file of this patent

UNITED STATES PATENTS

| 1,914,556 | Conover | June 20, 1953 |
| 2,697,724 | Collier | Dec. 21, 1954 |
| 2,746,991 | Miller | May 22, 1956 |
| 2,790,827 | Cummings et al. | Apr. 30, 1957 |
| 2,843,629 | Rust | July 15, 1958 |

OTHER REFERENCES

Calmon et al.: "Ion Exchangers in Organic and Biochemistry" (1957), pp. 527 and 543.

Nachod et al.: "Ion Exchange Technology" (1956), pp. 536 and 544–545.

(Copies of above in Pat. Off. Library.)